United States Patent Office 3,529,356
Patented Sept. 22, 1970

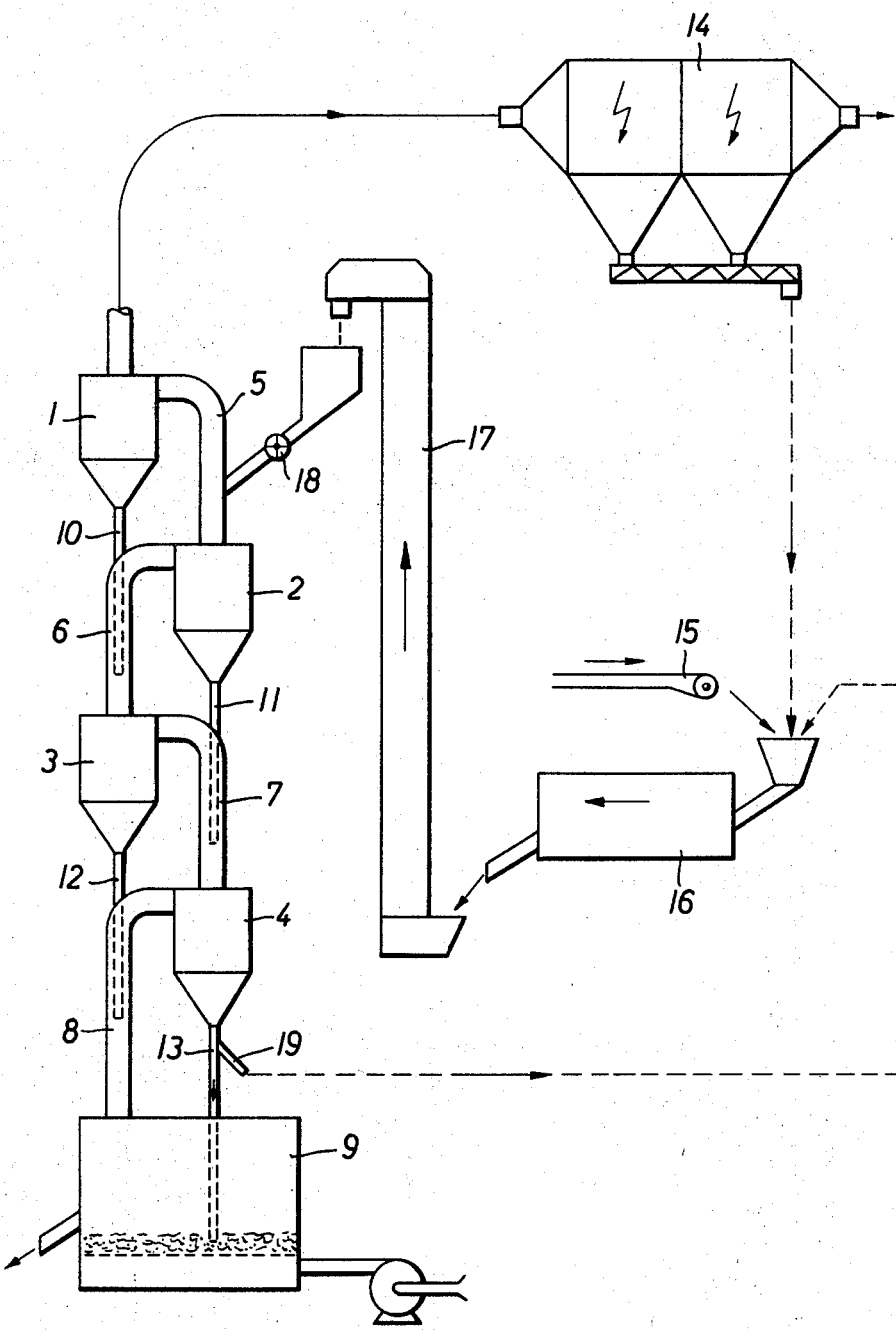

3,529,356
METHOD OF CONTINUOUSLY DEHYDRATING ALUMINUM OXIDE HYDRATES
Gunter Diettrich, Cologne-Braunsfeld, Germany, assignor to Klockner-Humboldt-Deutz Aktiengesellschaft, Cologne-Deutz, Germany, a German corporation
Filed Sept. 27, 1968, Ser. No. 763,190
Claims priority, application Germany, Oct. 6, 1967, 1,592,127
Int. Cl. F26b 3/00
U.S. Cl. 34—9                                                2 Claims

ABSTRACT OF THE DISCLOSURE

Aluminum oxide hydrates are continuously dehydrated in suspension in a stream of hot gases passing upwardly through a dehydrator comprising a plurality of cyclone separators. A portion of hot alumina is withdrawn from the lowermost cyclone separator, is mixed with the moist raw material and, if desired, also with dust separated from the gases leaving the upper end of the dehydrator, and is again introduced into the upper end of the dehydrator to be subjected to the hot gases therein.

---

The invention relates to a method of continuously dehydrating oxide hydrates of aluminum suspended in a stream of hot gases.

Aluminum oxide hydrate produced primarily in accordance with the Bayer-process has, as a rule, a residual surface moisture of about 10 to 12% and also still contains water soluble alkalis in varying concentrations which likewise stem from the treatment process. Consequently, in the dehydration of these aluminum oxide hydrates there exists the danger of incrustations building up on the walls of the dehydration apparatus. These incrustations are water-soluble alkalis which precipitate at the beginning of the evaporation of the surface moisture. They have a particularly harmful effect on the bent portions of the dehydrator located immediately in rear of the material intake because at this point the incrustations in time grow to such a size that they reduce the free passageway. From time to time large chunks of the incrusted material become loose from the wall and cause obstructions in the interposed cyclone separator.

Such incrustations, therefore, must be removed by special means, for instance by periodically operated knocking hammers. Although it is possible for the purpose of preventing the formation of incrustations to arrange in advance of the heat exchanger a drying apparatus for removing any surface moisture still present in the material to be treated, such drying apparatus has the disadvantage that it is not only a sizable capital investment, but that it also causes considerable expense in heat energy.

It is the object of the present invention to prevent the formation of incrustations in a dehydrator by less complicated and more economical means.

This object is attained according to the invention in that a part of the hot clay is withdrawn from the dehydrator and is added to the moist raw material alone or together with filter dust from a following dust separator and this mixture then is again fed to the dehydrator. The advantage of this method is that the surface moisture still present in the raw material partly is bound by the addition of the hot clay and partly is evaporated. Furthermore, the remaining moisture of the raw material is considerably reduced by the addition of the already dry clay and the dry filter dust. At the same time, the alkali content of the thus formed mixture is diluted to an extent that it lies under the amount that is conducive to crust formation. In this manner, namely by a simple mixing process, the formation of incrustations in a dehydrator can be prevented.

According to another feature of the invention, hot activated alumina is withdrawn from the end region of the dehydrator and is mixed with the moist raw material. Since the activated alumina is highly hygroscopic, nearly all of the surface moisture of the raw material is absorbed in this mixing process, thus preventing the formation of encrusted material.

In the following the invention will be described with reference to the accompanying drawing, the single figure of which illustrates a flow diagram of a plant for the production of inert and stable alpha-aluminum oxide.

The heat exchanger for the dehydration of aluminum oxide hydrate in suspension comprises the cyclones 1, 2, 3 and 4 which are arranged vertically in series with gas conduits 5, 6 and 7. A gas conduit 8 connects the lower portion of the heat exchanger arrangement with a fluidized bed drier or furnace 9 in which takes place the conversion of the dehydrated aluminum oxide from the gamma phase to the inert and stable alpha phase. The material discharge pipes 10, 11 and 12 of the cyclones 1, 2 and 3 extend and open into the next lower gas conduits 6, 7 and 8, respectively, which lead to the cyclones 2, 3 and 4. The discharge pipe 13 of the lowermost cyclone 4 leads into the furnace 9. The gases discharged by the uppermost cyclone 1 are conducted through a dust separator, for instance an electro-filter 14, where they are freed from dust.

The operation of the plant for continuously dehydrating aluminum oxide hydrates is as follows:

Raw material is withdrawn from a not illustrated filter apparatus, as for instance a drum filter, by means of an endless conveyor 15 and is discharged into a mixing apparatus 16 where it is mixed with hot activated alumina withdrawn from the heat exchanger by way of a branch 19 of the discharge pipe 13 and with dust withdrawn from the electro-filter 14. Arranged in rear of the mixer is a vertical conveyor 17, for instance a bucket elevator, which conveys the raw material pretreated in the mixer to a receiving vat disposed at the upper end of the heat exchanger from where it is introduced by means of a dose meter 18 into the hot gas conduit 5 extending between the cyclones 1 and 2.

The alumina hydrate is engulfed and carried along by the upwardly flowing hot furnace gases in the gas conduit 5 and is heated to the extent that the residual moisture present in the material is completely evaporated. The material is separated from the gas in the cyclone separator 1 and is passed downwardly through the discharge pipe 10 into the next lower gas conduit 6 and from the latter into the cyclone 2 and finally into the furnace 9. On their downward way the fine-grained oxide hydrates are subjected to hot gases of progressively increasing temperature and within a short time are so heated that the water of crystallization is completely driven out even before their separation from the hot gas stream in the lowermost cyclone 4. In the fluidized bed drier or furnace 9 then takes place the conversion of the strongly hygroscopic gamma phase crystals to their stable alpha phase.

What I claim is:

1. A method of converting the strongly hygroscopic gamma phase crystals of oxide hydrates of aluminum to stable alpha phase crystals, comprising the steps of continuously mixing a quantity of hot dehydrated alumina in a mixer with a quantity of moist raw oxide hydrates of aluminium, continuously feeding a controlled amount of the mixture thus obtained into a dehydrator through which a stream of hot gases is being passed, withdrawing a portion of the dehydrated mixture from said dehydrator for return to said mixer, and simultaneously discharging another portion of the dehydrated mixture from said dehydrator through a fluidized bed drier to effect said conversion of the crystals.

2. The method as set forth in claim 1, including the steps of filtering out dust carried along with the gases emerging from the dehydrator, and returning said dust to said mixer.

References Cited

UNITED STATES PATENTS 2,350,162   5/1944   Gordon _____ 34—11 X

CARROLL B. DORITY, Jr., Primary Examiner

U.S. Cl. X.R.

34—10, 11, 102